United States Patent
Matsushita et al.

(10) Patent No.: US 6,317,177 B1
(45) Date of Patent: Nov. 13, 2001

(54) LIQUID CRYSTAL DISPLAY DEVICE

(75) Inventors: Junichi Matsushita; Kunimitsu Aoki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/282,161

(22) Filed: Mar. 31, 1999

(30) Foreign Application Priority Data

Apr. 1, 1998 (JP) .................................................. 10-089069

(51) Int. Cl.[7] ...................... G01F 1/1335; G01F 1/1333; F21V 7/04

(52) U.S. Cl. ............................... 349/65; 349/64; 349/110; 362/31

(58) Field of Search ................................. 349/61, 62, 64, 349/65, 69, 70, 110; 362/31, 32

(56) References Cited

U.S. PATENT DOCUMENTS

| | | | |
|---|---|---|---|
| 5,619,351 | * | 4/1997 | Funamoto et al. ...................... 349/61 |
| 5,673,128 | * | 9/1997 | Ohta et al. .............................. 349/62 |
| 6,074,070 | * | 6/2000 | Sasako .................................... 362/31 |

FOREIGN PATENT DOCUMENTS 9-281492   10/1997   (JP) .

\* cited by examiner

*Primary Examiner*—Toan Ton
(74) *Attorney, Agent, or Firm*—Morgan, Lewis & Bockius LLP

(57) ABSTRACT

An LCD provided with an edge light type back light unit which is arranged in a manner that the light emitted from a CCT in the form of a linear light source is condensed at the end portion of a light conduction plate, then the light reflected by a reflecting sheet and then ejected from the light conduction plate transmits through a light diffusion plate thereby to indirectly irradiate on a liquid crystal panel from the rear direction thereof in the form of planar light with uniform luminance. A light reflecting plate having a curved surface is disposed in the vicinity of the CCT. A light shielding plate is disposed in a manner that a part of the light emitted from the CCT and reflected by the light reflecting plate is condensed at the end portion of the light conduction plate. Another part of the light emitted from the CCT and reflected by the light reflecting plate is directed upward and directly irradiates a part of the display area of the liquid crystal panel thereby to form a high luminance irradiation portion. Accordingly, thus configured LCD is improved in its visibility and so can be formed as a vehicle-mounted alarm display device for displaying various alarms.

3 Claims, 3 Drawing Sheets

LIQUID CRYSTAL DISPLAY DEVICE

BACKGROUND OF THE INVENTION

1. Field of the Invention

The present invention relates to a liquid crystal display device (LCD) intended to increase the luminance of a display screen thereof so as to be suitable for an alarm display device to be mounted on a vehicle such as an automobile or the like.

2. Description of the Related Art

FIG. 4 is a sectional side view of a lighting unit and a liquid crystal display device using it described in Japanese Patent Unexamined Publication No. Hei. 9-281492. In this case, a back light unit called an edge light type or a side light type using a light conduction plate 3 is employed as a lighting unit for irradiating a liquid crystal panel 8 of an LCD 1.

A housing 2 having an upper surface portion and a lower surface portion respectively shown in the upper and lower directions in the figure is provided with the light conduction plate 3 made of light transmission material at the center portion thereof. A fluorescent tube (hereinafter referred to as a CCT) 4 of a hot cathode tube or a cold cathode tube in the form of a linear light source is disposed at one end side of the light conduction plate 3. The linear light emitted from the CCT 4 is condensed at the end face of the light conduction plate 3 by means of a reflecting plate 5 having a curved surface and then conducted within the light conduction plate 3. The light from the CCT 4 thus conducted within the light conduction plate 3 is reflected upward by a reflecting sheet 6 disposed at the lower back side of the light conduction plate 3. In this manner, the light from the CCT 4 is formed as a planar light source, and the light from the planar light source transmits a light diffusion plate 7 disposed at the upward portion of the light conduction plate 3 thereby to illuminate the liquid crystal panel 8 provided at the uppermost portion of the housing 2 from the lower direction thereof. The light diffusion plate 7 is formed by an optical part such as a prism sheet or an element formed by translucent material effective for light diffusion.

Since the light from the CCT 4 transmits the light diffusion plate 7, the light is formed as a planar light source with a uniform luminance and then illuminated on the entire surface of the liquid crystal panel 8. As a result, the LCD 1 is formed as a dot matrix type LCD which displays characters or images on the display screen of the liquid crystal panel 8 in the form of the aggregation of dots, for example.

FIG. 5 shows another conventional example of the LCD having such an edge light type back light unit.

In this case, a plurality of CCTs 4 are disposed at the lower portion of the housing 2. A part of the light emitted from the respective CCTs 4 is reflected upward by a reflecting sheet 5 which is formed in a wave shape and disposed beneath the CCTs. The reflected light passes through a light modulation film 9 and transmits the light diffusion plate 7, whereby the light is formed as planar light with uniform luminance and then illuminated on the entire surface of the liquid crystal panel 8 from the lower direction thereof.

In each of the conventional LCDs shown in FIGS. 4 and 5, the back light unit serving as a planar light source still has the following problem to be improved.

The luminance of the light emitted from the surface of the side light type CCT 4 is usually about 30,000 cd/m². The light emitted from the CCT 4 as the linear light source passes through the light conduction plate 3 and the light diffusion plate 7 or the light modulation film 9, so that the luminance of the light is attenuated. Thus, the luminance of the light illuminated on the liquid crystal panel 8 from the planar light source is reduced. Further, the luminance of the displayed image is reduced to about 150cd/m² due to the transmittance of the liquid crystal panel 8.

In the case of displaying various kinds of alarms within a vehicle such as an automobile, the luminance of the displayed image is desirably 200 cd/m² or more at the maximum. However, the luminance of the displayed image of the LCD is generally about 150 cd/m² at the maximum. In the aforesaid conventional examples, since the luminance of the displayed image of the LCD is reduced to about 150 cd/m² due to the attenuation, the shortage of the luminance of the displayed image arises. Therefore, the aforesaid conventional LCDs are disadvantageous in that the visibility and the attention calling function thereof are deteriorated when used for a particular object such as a vehicle-mounted alarm display.

SUMMARY OF THE INVENTION

Accordingly, an object of the present invention is to provide an LCD which is intended to increase the luminance of a display screen thereof to thereby improve the visibility thereof so as to be effective for a vehicle-mounted alarm display device, in particular.

In order to achieve the aforesaid object, the present invention provides a liquid crystal display device including an edge light type back light unit in which light emitted from a linear light source is condensed at an end portion of a light conduction plate, then conducted and reflected, and a reflected light ejected from the light conduction plate is transmitted through a light diffusion plate to form a planar light source with a uniform luminance thereby to indirectly irradiate a liquid crystal panel from a rear side thereof, wherein a reflecting plate having a curved surface is disposed in a vicinity of the linear light source, and a light shielding plate is disposed so that a part of the light emitted from the linear light source and reflected by the reflecting plate is condensed at the end portion of the light conduction plate, whereby another part of the light emitted from the linear light source and reflected by the reflecting plate is directly irradiated with a higher luminance on a part of a display area of the liquid crystal panel than that of another part of the display area.

Further, the present invention provides a liquid crystal display device including an under light type back light unit in which light emitted from a plurality of linear light sources is reflected by a reflecting sheet disposed at a rear side of the plurality of linear light sources, then transmitted through a light modulation film and a light diffusion plate to form a planar light source with a uniform luminance thereby to indirectly irradiate a liquid crystal panel from a rear side thereof, wherein one end portion of the light modulation film is shielded by a light shielding plate, and light emitted from one of the plurality of linear light sources is shielded by the light shielding plate and transmitted through only the light diffusion plate thereby to directly irradiate with a higher luminance on a part of a display area of the liquid crystal panel than that of another part of the display area.

DETAILED DESCRIPTION OF THE PREFERRED EMBODIMENTS

Figure 4:
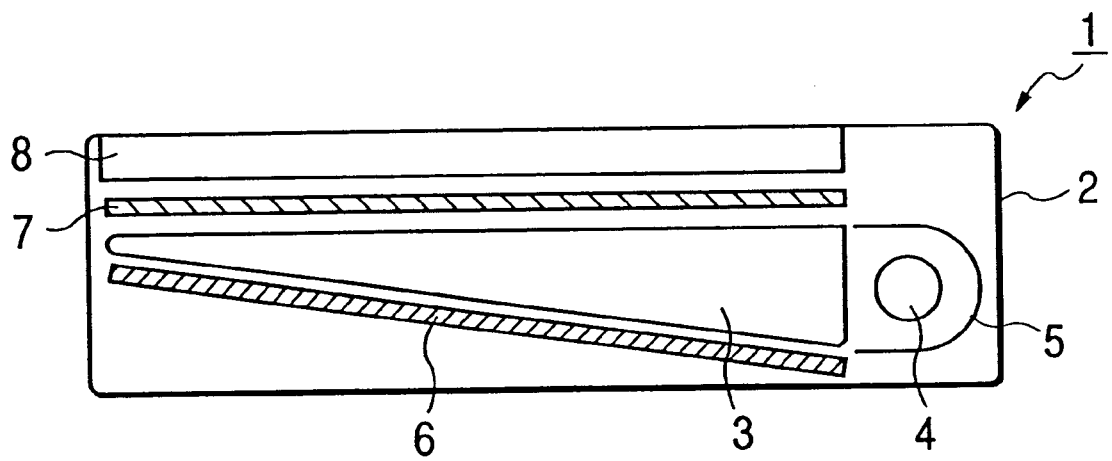
FIG. 4 is a sectional side view showing a conventional LCD with an edge light type back light unit.
Figure 5:
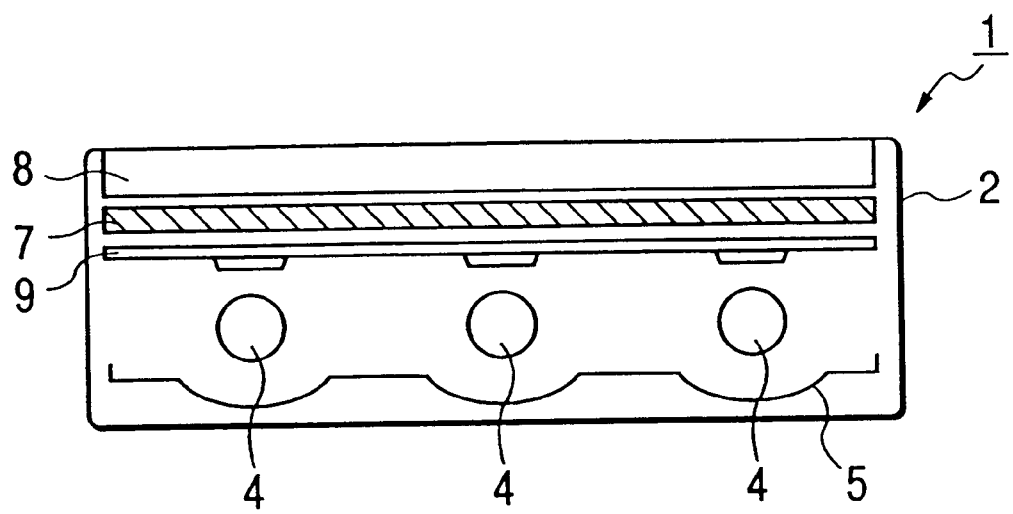
FIG. 5 is a sectional side view showing another conventional LCD with an under light type back light unit.

The LCDs according to the embodiments of the present invention will be described in detail with reference to the accompanying drawings. In the following embodiments, elements same as or common to those of the conventional LCDs shown in FIGS. 4 and 5 are designated by the same reference characters and the explanation thereof is omitted.

Figure 1:
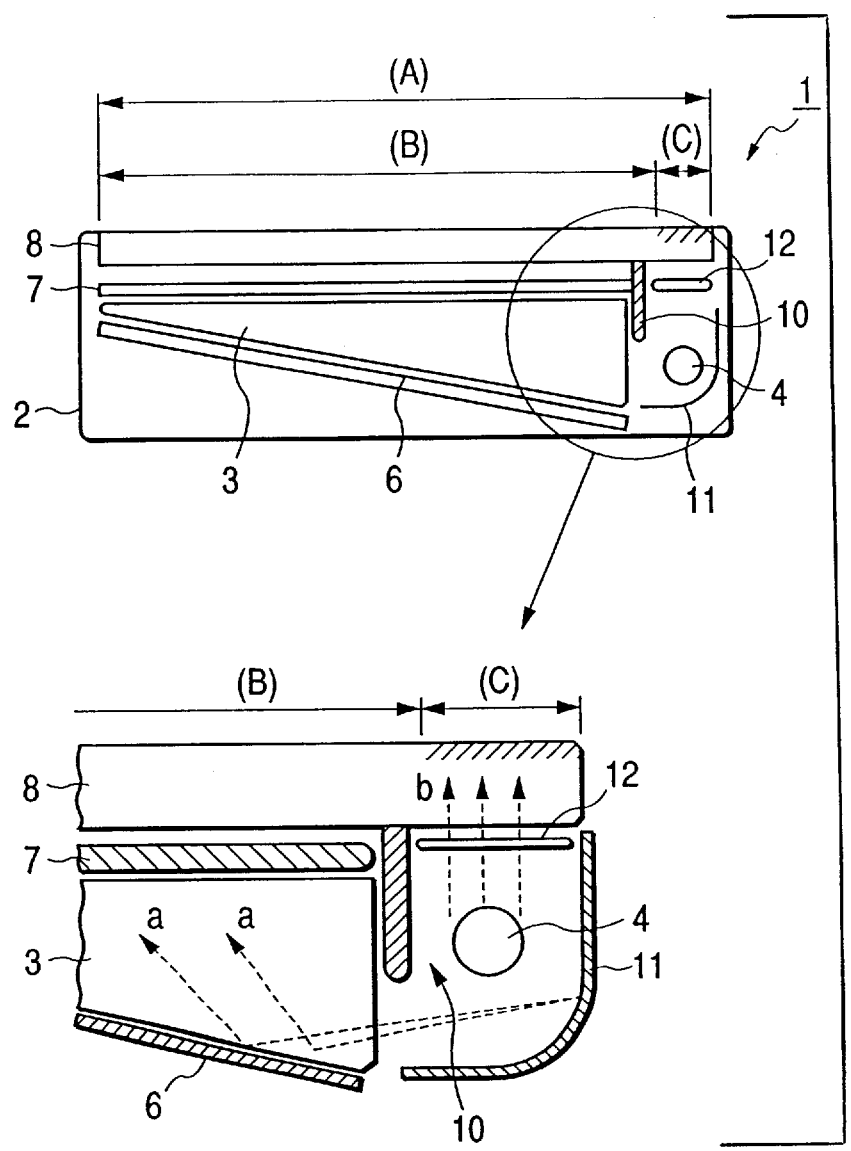
FIG. 1 is a sectional side view showing an LCD with an edge light type back light unit according to a first embodiment of the present invention and further showing the main portion thereof in an enlarged scale.

FIG. 1 is a sectional side view of an LCD 1 according to the first embodiment and further shows the main portion thereof (circled portion) in an enlarged scale. In this case, the upper surface portion and the lower surface portion of the LCD 1 are respectively shown in the upper and lower directions in the figure, like the conventional examples shown in FIGS. 4 and 5. The LCD 1 according to the embodiment is arranged to have an edge light type back light unit.

A light conduction plate 3 disposed at the center portion of a housing 2 is formed by transparent resin material or the like so that each of the upper and lower surfaces thereof is formed to be flat and smooth. The light conduction plate 3 is slanted from one side toward the other side thereof such that the thickness thereof becomes smaller so as to have a substantially rectangular shape in its sectional side view. A cold cathode fluorescent tube CCT 4 in the form of a linear light source is disposed to face on the one end side with the larger thickness of the light conduction plate 3.

A light shielding plate 10 is disposed between the one end side of the light conduction plate 3 and the CCT 4 so as to have such a size and a shape that almost half of the light emitted from the CCT 4 toward the one end side of the light conduction plate 3 is shielded by the light shielding plate. A light reflecting plate 11 having a curved surface opened upward is disposed at the position opposite to the light shielding plate 10. Further, a light diffusion plate 12 having a thin thickness is disposed in the upper direction of the CCT 4. These constituent elements configure the gist of the LCD of the present invention.

According to such a configuration, a part of the planar light emitted from the CCT 4 is reflected by the light reflecting plate 11, then the reflected light passes below the light shielding plate 10 and is condensed at the end face of the one end side of the light conduction plate 3. Further, another part of the planar light emitted from the CCT 4 is reflected by the light reflecting plate 11 and the reflected light directed upward is transmittable through the light diffusion plate 12. That is, the part of the light emitted from the CCT 4 is directed upward and capable of directly irradiating the part of a liquid crystal panel 8 from the lower direction thereof by merely transmitting through the light diffusion plate 12.

On the other hand, a reflecting sheet 6 is disposed at the rear surface side of the light conduction plate 3 along the slanted surface of the lower surface thereof. The light emitted from the CCT 4 and condensed at the one end surface of the light conduction plate 3 is reflected upward by means of the reflecting sheet 6. A light diffusion plate 7 is disposed in the upper direction of the light conduction plate 3, whereby the light reflected by the reflecting sheet 6 and then ejected from the light conduction plate 3 transmits the light diffusion plate 7 disposed above the light conduction plate thereby to be formed in uniform planar light. The light thus transmitted through the light diffusion plate 7 is indirectly irradiated on the liquid crystal panel 8 from the lower direction thereof as a back light of a planar light source with uniform luminance. The light diffusion plate 7 may be formed by an optical part such as a prism sheet or an element formed by translucent material effective for light diffusion.

According to the aforesaid configuration, the LCD of the first embodiment operates in the following manner. The operation of the LCD will be described also with reference to FIG. 2 showing the entire main surface of the liquid crystal panel 8.

A part of the light emitted from the CCT 4 as the linear light source is reflected by the light reflecting plate 11, then passes beneath the light shielding plate 10 and is condensed at the one end surface of the light conduction plate 3 (as shown by a dotted arrow a in FIG. 1). A part of the light incident into the light conduction plate 3 is reflected upward by means of the reflecting sheet 6 disposed at the rear surface of the light conduction plate 3 and transmits through the light diffusion plate 7. The light transmitted through the plate 7 is irradiated as uniform planar indirect light with a normal luminance on a display area (B) which occupies the most part of an entire display area (A) of the liquid crystal panel 8, from the lower direction thereof.

On the other hand, another part of the light emitted from the CCT 4 is shielded by the light shielding plate 10, and still another part of the light emitted from the CCT 4 is reflected by the light reflecting plate 11 and directed upward, then transmits the light diffusion plate 12 and irradiates a part of the liquid crystal panel 8 (as shown by a dotted arrow b in FIG. 1). Since this irradiated light only transmits the light diffusion plate 12 with a thin thickness on the way thereof, the irradiated light is not attenuated and so can be irradiated on the part of the liquid crystal panel 8 with a required high luminance from the lower direction thereof.

Figure 2:
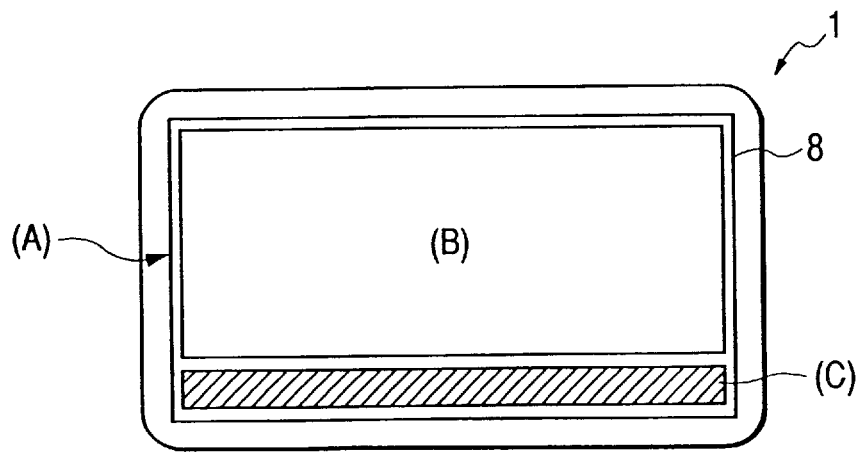
FIG. 2 is a plan view showing a high-luminance display area of a liquid crystal panel in the first embodiment.

That is, as shown in FIG. 2, a part of the linear light emitted from the CCT 4 and ejected from the light conduction plate 3 transmits the light diffusion plate 7 and then indirectly irradiates the display area (B) which occupies the most part of the entire display area (A) of the liquid crystal panel 8, from the lower direction thereof. According to this indirect irradiation, the irradiated display area occupying the most part of the entire display area serves as a normal luminance irradiation portion (B) of the display portion of the liquid crystal panel. In contrast, the light emitted upward from the CCT 4 transmits only the light diffusion plate 12 and then directly irradiates a part of the display area of the liquid crystal panel 8 from the lower direction thereof. According to this direct irradiation, this irradiated part of the display area of the liquid crystal panel serves as a high luminance irradiation portion (C) of the display portion of the liquid crystal panel.

Since the high luminance irradiation portion (C) is formed at the part of the entire display area (A) of the liquid crystal panel 8, the shortage of the luminance in the liquid crystal panel 8 is eliminated. Accordingly, a display screen with a high luminance and good visibility can be obtained when this LCD 1 is employed as a vehicle-mounted alarm display device.

Figure 3:
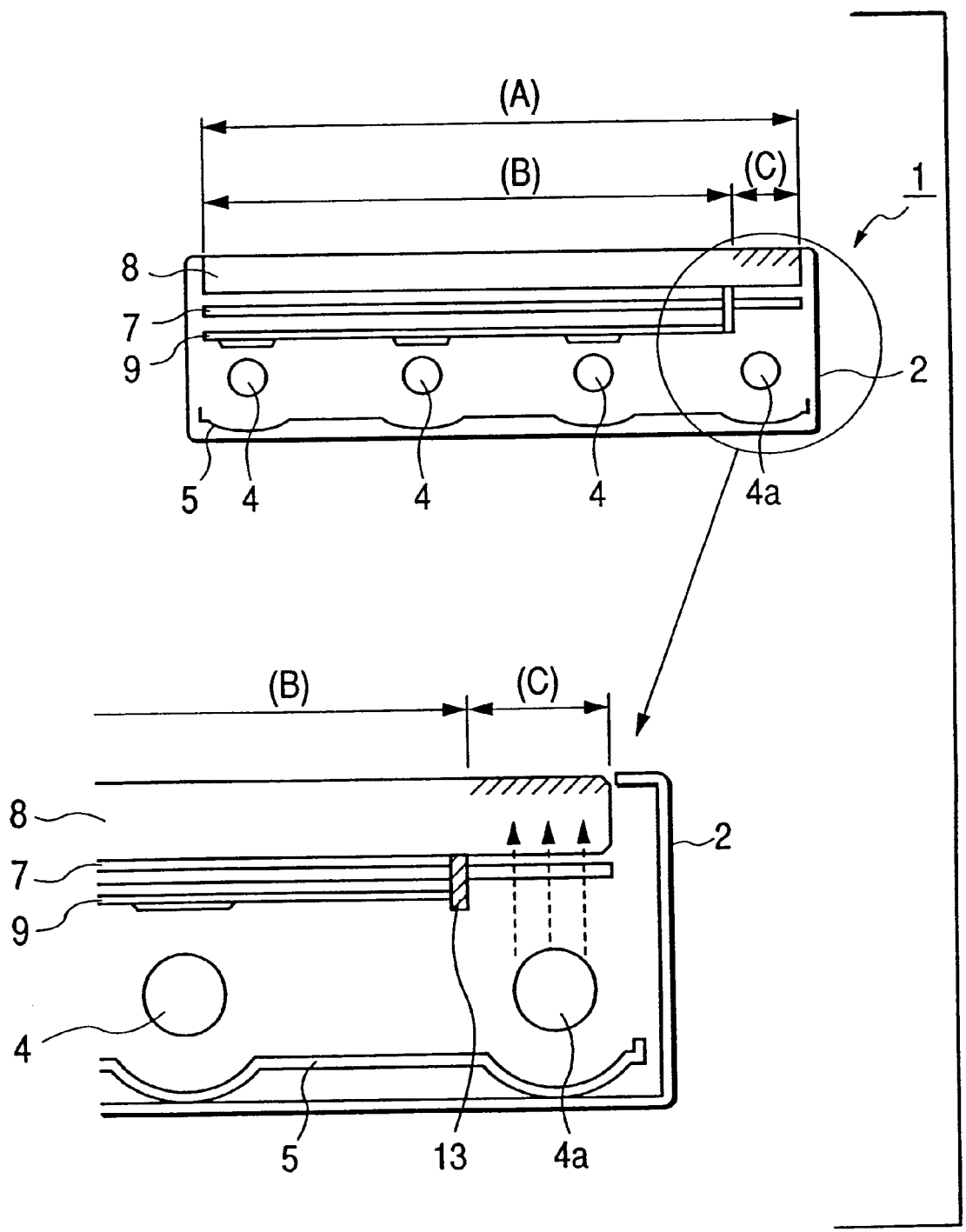
FIG. 3 is a sectional side view showing an LCD with an under light type back light unit according to a second embodiment of the present invention and further showing the main portion thereof in an enlarged scale.

FIG. 3 shows an LCD 1 according to the second embodiment of the present invention. In this figure, elements same as or common to those of the first embodiment are designated by the same reference characters. In this embodiment, a plurality of CCTs 4 are disposed at the lower portion of a housing 2. The light emitted from these CCTs 4 is reflected upward by a reflecting sheet 5 which is formed in a wave shape and disposed at the rear portion thereof. A light modulation film 9 is disposed above the CCTs 4, and a light diffusion plate 7 is disposed above the light modulation film 9. That is, the LCD 1 of the second embodiment is a kind of the under light type back light unit.

Thus, this embodiment is arranged in a manner that the light modulation film 9 is not disposed in the upper direction of one of the CCTs 4 (that is, CCT 4a) and the light emitted from the CCT 4a is shielded by a light shielding plate 13, whereby the light emitted from the CCT 4a transmits the light diffusion plate 7 and can be directly irradiated on a part of a liquid crystal panel 8.

Accordingly, in this embodiment, since the light emitted from the plurality of CCTs 4 transmits the light modulation film 9 and the light diffusion plate 7, a display area (B) which occupies the most part of an entire display area (A) of the liquid crystal panel 8 is indirectly irradiated, from the lower direction thereof. According to this indirect irradiation, the irradiated display area occupying the most part of the entire display area serves as a normal luminance irradiation portion (B) of the display portion of the liquid crystal panel. In contrast, the light emitted upward from the CCT 4a transmits only the light diffusion plate 7 and then directly irradiates a part (C) of the display area of the liquid crystal panel 8 from the lower direction thereof. According to this direct irradiation, this irradiated part of the display area of the liquid crystal panel serves as a high luminance irradiation portion (C) of the display portion of the liquid crystal panel.

As will be understood from the LCDs according to the first and second embodiments, the present invention can form a high luminance area in the liquid crystal panel 8 with a lower cost without using particular parts as compared with the conventional LCDS.

Each of the LCDs according to the aforesaid embodiments may be applied to the segment type as the display method of characters and images, and is effective in particular for the dot matrix type which displays characters or images in the form of the aggregation of dots.

As described above, in the conventional LCD, when a back light unit called an edge light type or a side light type using a light conduction plate is employed as a lighting unit for lighting a liquid crystal panel of the LCD, there arises a problem that the luminance becomes insufficient when the LCD is used for a particular object such as a vehicle-mounted alarm device. In contrast, the LCD according to the present invention is advantageous in that the display can be performed with a high luminance through the constructional improvement without using particular parts thereby to eliminate the aforesaid conventional problem.

What is claimed is:

1. A liquid crystal display device including an edge light type back light unit in which light emitted from a linear light source is condensed at an end portion of a light conduction plate, then conducted and reflected, and a reflected light ejected from the light conduction plate is transmitted through a light diffusion plate to form a planar light source with a first uniform luminance indirectly irradiating a first central portion of a liquid crystal panel from a rear side thereof, wherein a reflecting plate having a curved surface is disposed in a vicinity of the linear light source, and a light shielding plate is disposed so that part of the light emitted from the linear light source and reflected by the reflecting plate is condensed at the end portion of the light conduction plate, and another part of the light emitted from the linear light source and reflected by the reflecting plate irradiates a second peripheral portion of the liquid crystal panel from the rear side thereof with a second luminance higher than the first uniform luminance.

2. The liquid crystal display device according to claim 1, wherein the linear light source is disposed so as to face on at least one end portion of the light conduction plate.

3. The liquid crystal display device according to claim 1, wherein the light diffusion plate is extended to be positioned between the linear light source and the liquid crystal panel, and another part of the light emitted from the linear light source and reflected by the reflecting plate is transmitted through the extended portion of the light diffusion plate and irradiated with a higher luminance on a part of the display area of the liquid crystal panel than that of another part of the display area.

* * * * *